US010210865B2

United States Patent
Qin et al.

(10) Patent No.: US 10,210,865 B2
(45) Date of Patent: Feb. 19, 2019

(54) METHOD AND APPARATUS FOR INPUTTING INFORMATION

(71) Applicant: BEIJING BAIDU NETCOM SCIENCE AND TECHNOLOGY CO., LTD., Beijing (CN)

(72) Inventors: Tian Qin, Beijing (CN); Xiaolei Zhao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 86 days.

(21) Appl. No.: 15/429,353

(22) Filed: Feb. 10, 2017

(65) Prior Publication Data

US 2018/0061407 A1 Mar. 1, 2018

(30) Foreign Application Priority Data

Aug. 30, 2016 (CN) .......................... 2016 1 0770021

(51) Int. Cl.
*G10L 15/00* (2013.01)
*G10L 15/18* (2013.01)
(Continued)

(52) U.S. Cl.
CPC ............ *G10L 15/22* (2013.01); *G06F 3/0236* (2013.01); *G06F 3/0237* (2013.01);
(Continued)

(58) Field of Classification Search
None
See application file for complete search history.

(56) References Cited

U.S. PATENT DOCUMENTS

2007/0208569 A1* 9/2007 Subramanian ...... G10L 19/0018
704/270
2010/0158213 A1* 6/2010 Mikan ............... H04M 3/42221
379/88.14

(Continued)

FOREIGN PATENT DOCUMENTS

JP 2003129711 A 5/2003
JP 2007003669 A 1/2007
(Continued)

OTHER PUBLICATIONS

Nakamura et al. (2003) "Learning face mark for natual language dialogue system," University of Agriculture and Technology, Department of Computer, Information and Communication Sciences, 8 pp.
English Translation of Office Action in Japanese Patent Application No. 2017-023271 dated Apr. 11, 2018, 7 pp.

*Primary Examiner* — Kevin Ky
(74) *Attorney, Agent, or Firm* — Lathrop Gage LLP

(57) ABSTRACT

The present disclosure provides a method and apparatus for inputting information. A specific implementation mode of the method comprises: receiving user-inputted voice information, the voice information being associated with content to be inputted in an input area of an application; considering emojis associated with the voice information as a candidate result, the emojis comprising: emojis historically inputted in the input area of the application by multiple users inputting voice information semantically associated with the voice information, with a frequency higher than a frequency threshold; inputting an emoji selected by the user from the candidate result, in the input area of the application. The present disclosure implements the following: when the user performs voice input, it is feasible to accurately understand the intention of the user's voice input, intelligently recommend a matched emoji according to content and emotion of
(Continued)

the speech, assist the user in performing quick input of the emoji.

12 Claims, 4 Drawing Sheets

(51) Int. Cl.
G10L 15/22 (2006.01)
G06F 3/0481 (2013.01)
G06F 3/0482 (2013.01)
G10L 25/63 (2013.01)
G06F 17/27 (2006.01)
G06F 3/023 (2006.01)
G10L 15/26 (2006.01)
G10L 15/30 (2013.01)

(52) U.S. Cl.
CPC ........ *G06F 3/0482* (2013.01); *G06F 3/04817* (2013.01); *G06F 17/276* (2013.01); *G06F 17/2785* (2013.01); *G10L 15/1815* (2013.01); *G10L 15/26* (2013.01); *G10L 25/63* (2013.01); *G10L 15/30* (2013.01)

(56) References Cited

U.S. PATENT DOCUMENTS

| 2012/0101805 | A1* | 4/2012 | Barbosa ................. G06F 17/27 704/9 |
| 2013/0159919 | A1 | 6/2013 | Leydon |
| 2014/0052441 | A1* | 2/2014 | Fujibayashi .......... G06F 17/241 704/231 |
| 2014/0108308 | A1* | 4/2014 | Stout ....................... G06N 3/08 706/12 |
| 2015/0100537 | A1 | 4/2015 | Grieves et al. |
| 2016/0156584 | A1* | 6/2016 | Hum ....................... H04L 51/32 715/752 |
| 2016/0371791 | A1* | 12/2016 | Lee ......................... G06Q 50/01 |
| 2017/0220677 | A1* | 8/2017 | Kazi ................ G06F 17/30705 |
| 2018/0077095 | A1* | 3/2018 | Deyle ..................... H04L 51/10 |

FOREIGN PATENT DOCUMENTS

| JP | 2008129711 A | 6/2008 |
| KR | 20090051851 A | 5/2009 |
| KR | 20090054609 A | 6/2009 |
| WO | WO 2013094982 A1 | 6/2013 |

* cited by examiner

METHOD AND APPARATUS FOR INPUTTING INFORMATION

CROSS-REFERENCE TO RELATED APPLICATION

This application claims the priority of Chinese Patent Application No. 201610770021.0, entitled "Method and Apparatus for Inputting Information," filed on Aug. 30, 2016, the content of which is incorporated herein by reference in its entirety.

TECHNICAL FIELD

The present disclosure relates to the technical field of computers, specifically to the field of input methods, and particularly to a method and apparatus for inputting information.

BACKGROUND

At present, some input methods provide a voice input function. When using the voice input function of an input method to input, the user usually utilizes a method of inputting after converting the inputted voice into sentences. However, when this method is used for voice input, it cannot meet the user's need to input different kinds of emojis in different situations. The voice input function is relatively simple.

SUMMARY

The present disclosure provides a method and apparatus for inputting information, to solve the technical problems mentioned in the Background.

In a first aspect, the present disclosure provides a method for inputting information, the method comprising: receiving user-inputted voice information, the voice information being associated with content to be inputted in an input area of an application; considering emojis associated with the voice information as a candidate result, the emojis comprising: emojis historically inputted in the input area of the application by multiple users inputting voice information semantically associated with the voice information, with a frequency higher than a frequency threshold; inputting an emoji selected by the user from the candidate result, in the input area of the application.

In a second aspect, the present disclosure provides an apparatus for inputting information, the apparatus comprising: a receiving unit configured to receive user-inputted voice information, the voice information being associated with content to be inputted in an input area of an application; a selecting unit configured to consider emojis associated with the voice information as a candidate result, the emojis comprising: emojis historically inputted in the input area of the application by multiple users inputting voice information semantically associated with the voice information, with a frequency higher than a frequency threshold; an input unit configured to input an emoji selected by the user from the candidate result, in the input area of the application.

According to the information input method and apparatus provided by the present disclosure, user-inputted voice information is received, and the voice information is associated with content to be inputted in an input area of an application; emojis associated with the voice information are considered as a candidate result, and the emojis comprise: emojis historically inputted in the input area of the application by multiple users inputting voice information semantically associated with the voice information, with a frequency higher than a frequency threshold; an emoji selected by the user from the candidate result is inputted in the input area of the application. The present disclosure implements the following: when the user performs voice input, it is feasible to accurately understand the sense of the user's voice input, intelligently recommend a matched emoji according to content and emotion of the speech, assist the user in performing quick input of the emoji, shorten the user's complicated operation in looking up the emoji, and provide convenience to the user.

BRIEF DESCRIPTION OF THE DRAWINGS

Other features, objectives and advantages of the present disclosure will be made more apparent by reading through detailed description of unrestrictive embodiments with reference to the following figures.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
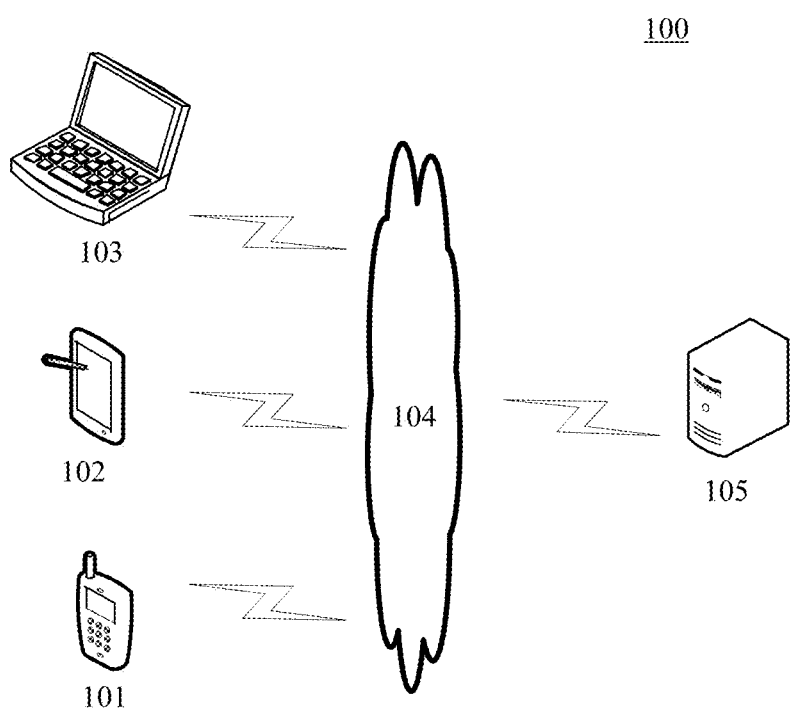
FIG. 1 is a diagram of an exemplary system architecture which may be applied to an embodiment of a method or apparatus for inputting information according to the present disclosure.

FIG. 1 shows an exemplary architecture of a system 100 which may be used by an information input method or an information input apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as input applications, web browser applications, search applications, word processing applications, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may acquire a mass of emojis and send the mass of emojis to input method-like applications on the terminal equipment 101, 102, 103. The input method-like applications on the terminals 101, 102, 103 may record the user-inputted voice information and establish a corresponding relationship of the voice information and emojis of a previous screen.

It should be appreciated that the number of the terminal equipment, network and server in FIG. 1 are only illustrative. There may be any number of terminal equipment, networks and servers according to needs in implementation.

Figure 2:
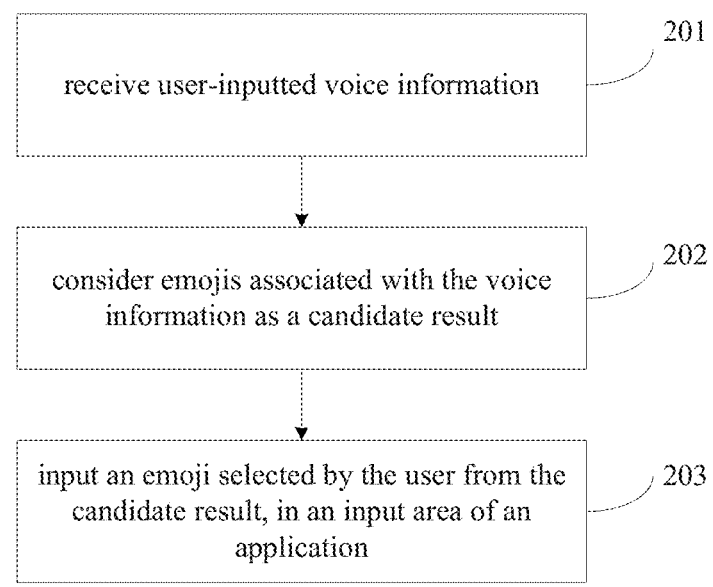
FIG. 2 is a flow chart of an embodiment of a method for inputting information according to the present disclosure.

Turning to FIG. 2, FIG. 2 illustrates a flow chart 200 of an embodiment of a method for inputting information according to the present disclosure. It needs to be appreciated that the information input method provided by the embodiment of the present disclosure may be executed by the terminal equipment 101, 102, 103 in FIG. 1, and correspondingly, the information input apparatus may be disposed in the terminal equipment 101, 102, 103. The method comprises the following steps:

Step 201: receiving voice information inputted by the user.

In the present embodiment, the user's voice information is associated with content to be inputted in an input area of an application. For example, when users chat via an instant messaging application, and when content needs to be inputted to in input area of the instant messaging application, they may input voice information via a voice input device such as a microphone.

Step 202: considering emojis associated with the voice information as a candidate result.

In the present embodiment, the emojis associated with the voice information include: an emoji historically inputted in an input area of an application by multiple users inputting voice information semantically associated with the voice information, with a frequency higher than a frequency threshold.

In the present embodiment, when multiple users input the semantically associated voice information, it is feasible to select emojis appearing in a high frequency on the screen as the candidate result and recommend them to the current users who input the voice information.

In some optional implementations of the present embodiment, the method further comprises: acquiring multiple users' historical input information. The historical input information includes: input voice information in the historical input, and emojis input in the input area of the application; determining semantically associated multiple pieces of voice information; converging emojis corresponding to the semantically associated multiple pieces of voice information; selecting, from the emojis, an emoji having a corresponding input frequency is higher than the frequency threshold.

In the present embodiment, in order to consider the emojis associated with the voice information as the candidate result during the user's voice input, emojis are recommended to the user and it is feasible to pre-establish corresponding relationship between the user-inputted massive voice information and the mass of emojis.

In the present embodiment, the user in step 201 may refer to the user currently inputting the voice information. Before receiving the user-inputted voice information through step 201, it is feasible to pre-acquire voice information once input by massive users in historical input and emojis input in the input area of the application (for example, input area of the instant messaging application) when the voice information is input, namely, emojis that are put on screen. It is feasible to look up semantically associated voice information from massive users' historical input to obtain a plurality of voice information sets. Each voice information set includes voice information associated with voice input by multiple users. Meanwhile, when the voice information input by multiple users in the voice information set is converged, it is feasible to select emojis put on the screen and obtain an emoji set.

Therefore, it is feasible to establish a corresponding relationship between the voice information set formed by the semantically associated voice information and the emoji set, each voice information set corresponding to one emoji set. The corresponding relationship between the voice information set and the emoji set may indicate which emojis are selected and put on the screen when multiple users input semantically associated voice information. Furthermore, it is feasible to look up emojis whose on-screen frequency is higher than the frequency threshold, in the emoji set corresponding to the voice information set, that is, look up emojis that are put on the screen more selected when multiple users input the semantically associated voice information.

After the corresponding relationship between the massive users inputted voice information and the mass of emojis is pre-established, when the current user performs voice input in step 201, it is feasible to look up the voice information associated with the voice information input by the current user, and determine the voice information set to which the voice information associated with the voice information input by the current user belongs. Then, it is feasible to look up emojis whose on-screen frequency is higher than the frequency threshold, in the emoji set corresponding to the voice information set, that is, look up the emojis that are put on the screen more when multiple users input the semantically associated voice information, as the candidate result.

For example, when multiple users input, via voice, semantically associated voice information such as "how free" and "work of this week has been completed in advance" in historical input, the emojis put on the screen all are emoji "coffee" in a relaxed type, i.e., the emoji "coffee" whose input frequency is higher than the frequency threshold.

When the user inputs, via voice, "relaxing Friday afternoon" in the current input in step 201, since "relaxing Friday afternoon" is semantically associated with "how free" and "work of this week has been completed in advance," it is feasible to recommend the on-screen emoji corresponding to "how free" and "work of this week has been completed in advance," namely, the emoji "coffee," as the candidate result, to the user currently inputting the voice information.

Step 203: inputting the emoji selected by the user from the candidate result, in the input area of the application.

In the present embodiment, after the emoji associated with the voice information is considered as the candidate result in step 202, it is feasible to input the emoji selected by the user from the candidate result, in the input area of the application. That is, the user may select and look up the emoji that appears more often on the screen as a result of multiple users' inputting the semantically associated voice information through step 201, as the candidate result and input it into the input area of the application.

For example, when users chat via an instant messaging application, the voice information "relaxing Friday afternoon" input by the user is semantically associated with the preceding voice information such as "how free" and "work of this week has been completed in advance" input by multiple users, and the on-screen emoji previously selected by each of multiple users upon inputting the voice information such as "how free" and "work of this week has been completed in advance" is the emoji "coffee," namely, the on-screen frequency is higher than the frequency threshold, then the candidate result may include the emoji "coffee". The user who currently inputs "relaxing Friday afternoon" via voice may select the emoji "coffee" from the candidate result and put it on the screen.

In the present embodiment, the input method may execute the above steps 201-203. When the user performs voice input, the input method can accurately understand the sense of the user's voice input, and intelligently recommend a matched emoji according to content and emotion of the speech, assist the user in performing quick input of the emoji, shorten the user's complicated operation in looking up the emoji, and provide convenience to the user.

Figure 3:
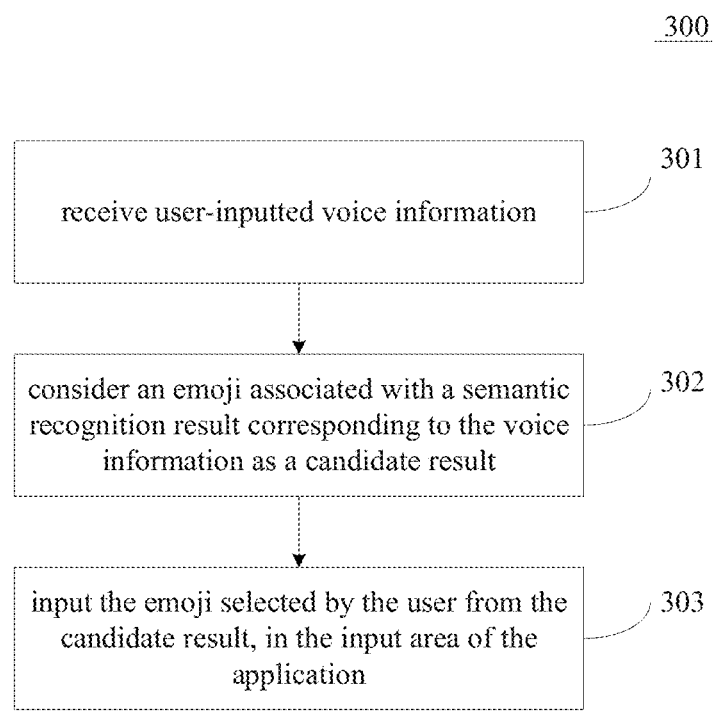
FIG. 3 is a flow chart of another embodiment of a method for inputting information according to the present disclosure.

Referring to FIG. 3, FIG. 3 illustrates a flow chart 300 of another embodiment of a method for inputting information according to the present disclosure. It needs to be appreciated that the information input method provided by the embodiment of the present disclosure may be executed by the terminal equipment 101, 102, 103 in FIG. 1. The method includes the following steps:

Step 301: receiving user-inputted voice information.

In the present embodiment, the user's voice information is associated with content to be inputted in an input area of an application. For example, when the user needs to input content in the input area of the application, he may input the voice information via a voice input device such as a microphone.

Step 302: considering an emoji associated with a semantic recognition result corresponding to the voice information as a candidate result.

In the present embodiment, after the user-inputted voice information is received through the step 301, it is feasible to perform semantic recognition for the voice information and obtain a sentence corresponding to the voice information. Then, it is feasible to perform semantic recognition for the sentence in a rule matching to obtain the semantic recognition result.

In the present embodiment, it is feasible to perform semantic recognition for the sentence corresponding to the input voice information in a rule matching to obtain the semantic recognition result. The semantic recognition result includes: a mood type indicating the user's mood. For example, it is feasible to pre-set a rule matching template including a key word of the mood type indicating the user's mood, and set a rule matching template in a corresponding type for the user's different types of mood. When the sentence corresponding to the user-inputted voice information matches the rule matching template, the mood type of the user's mood may be determined according to the type of the rule matching template.

In the present embodiment, it is feasible to pre-establish a corresponding relationship between each mood type and the emoji. It is feasible to, according to the corresponding relationship between each mood type and the emoji, determine the emoji corresponding to the user' mood type obtained by performing semantic recognition for the user-inputted voice information. Hence, it is feasible to consider the emoji corresponding to the mood type as the candidate result. For example, when the user inputs "how free," it is feasible to, through semantic recognition, recognize that the user's mood type is a relaxed type, and feasible to consider an emoji such as "coffee" belonging to the emojis in the relaxed type, as the candidate result.

In the present embodiment, it is feasible to establish a corresponding relationship between a mass of emojis and mood types in the following manner: pre-acquiring a plurality of emojis, and marking the plurality of emojis to obtain marked information of the emojis. The marked information of the emojis may indicate the mood type of the user's mood corresponding to the emojis. For example, it is possible to classify the mood type of the user's mood into sub-types such as especially happy, relatively happy and the like. It is possible to use the emojis and the marked information as sample data to train a deep learning model. For example, emojis in sub-types of the relaxed mood and marked information of emojis in the sub-types may be used as the sample data to train the deep learning model. After the deep learning model is trained using the plurality of emojis and the marked information of the plurality of emojis, the deep learning model may learn a corresponding relationship between features of the emojis and the mood type. It is feasible to use the trained deep learning model to recognize the mood types corresponding to the mass of emojis and establish the corresponding relationship between the mass of emojis and the mood types.

In the present embodiment, in step 301 the user may refer to the user currently inputting the voice information. Before receiving the user-inputted voice information through step 301, it is feasible to pre-acquire voice information once input by massive users in historical input and emojis input in the input area of the application (for example, input area of the instant messaging application) when the voice information is input, namely, emojis that are put on screen. It is feasible to look up semantically associated voice information from massive users' historical input to obtain a plurality of voice information sets. Each voice information set includes voice information associated with voice input by multiple users. Meanwhile, when the voice information input by multiple users in the voice information set is converged, it is feasible to select emojis put on the screen and obtain an emoji set.

Therefore, it is feasible to establish a corresponding relationship between the voice information set formed by the semantically associated voice information and the emoji set, each voice information set corresponding to one emoji set. The corresponding relationship between the voice information set and the emoji set may indicate which emojis are selected and put on the screen when multiple users input semantically associated voice information. Furthermore, it is feasible to look up emojis whose on-screen frequency is higher than the frequency threshold, in the emoji set corresponding to the voice information set, that is, look up emojis that are put on the screen more selected when multiple users input the semantically associated voice information.

After the corresponding relationship between the massive users inputted voice information and a mass of emojis is pre-established, when the current user performs voice input in step 301, it is feasible to look up the voice information associated with the voice information input by the current user, and determine the voice information set to which the voice information associated with the voice information input by the current user belongs. Then, it is feasible to look up emojis whose on-screen frequency is higher than the frequency threshold, in the emoji set corresponding to the voice information set, that is, look up the emojis that are put on the screen more when multiple users input the semantically associated voice information, as the candidate result.

For example, when multiple users input, via voice, semantically associated voice information such as "how free" and "work of this week has been completed in advance" in historical input, it is feasible to, through semantic recognition, identify that the user's mood type is a relaxed type, and recommend emojis in the relaxed type as the candidate result. The emojis in the relaxed type include the emoji "coffee." When users inputting semantically associated voice information such as "how free" and "work of this week has been completed in advance" all select and put the emoji "coffee" on the screen, it is feasible to record the emoji "coffee" selected and put by the user on the screen.

Therefore, when the current user inputs "relaxing Friday afternoon" via voice in step 301, since "relaxing Friday afternoon" put by the current user via voice is semantically associated with "how free" and "work of this week has been completed in advance," it is feasible to recommend the on-screen emoji "coffee" corresponding to the voice information "how free" and "work of this week has been completed in advance," as the candidate result, to the user currently inputting the "relaxing Friday afternoon" via voice.

Step 303: inputting the emoji selected by the user from the candidate result, in the input area of the application.

In the present embodiment, after the emoji associated with the voice information is considered as the candidate result in step 302, it is feasible to input the emoji selected by the user from the candidate result, in the input area of the application. That is, the user may select and look up the emoji that is put on the screen more when multiple users input the semantically associated voice information input through step 301, as the candidate result and input it in the input area of the application.

For example, when users chat via an instant messaging application, the voice information "relaxing Friday afternoon" input by the user is semantically associated with the preceding voice information such as "how free" and "work of this week has been completed in advance" input by multiple users, and the on-screen emoji previously selected by each of multiple users upon inputting the voice information such as "how free" and "work of this week has been completed in advance" is the emoji "coffee," namely, the on-screen frequency is higher than the frequency threshold, then the candidate result may include the emoji "coffee." Upon inputting "relaxing Friday afternoon" via voice, the current user may select the emoji "coffee" from the candidate result and put it on the screen.

In the present embodiment, the above steps 301-303 in the present embodiment may be executed via the input method. When the user performs voice input, the input method can accurately understand the sense of the user's voice input, and intelligently recommend a matched emoji according to content and emotion of the speech, assist the user in performing quick input of the emoji, shorten the user's complicated operation in looking up the emoji, and provide convenience to the user.

Figure 4:
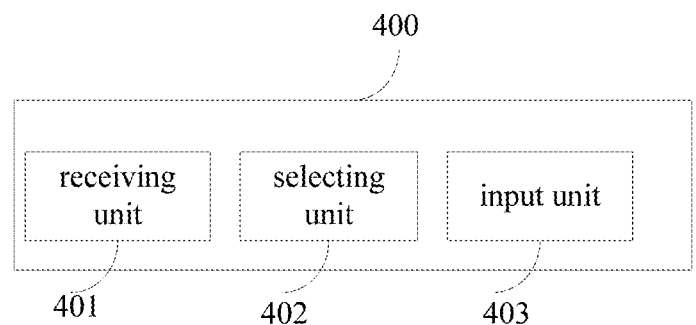
FIG. 4 is a structural schematic view of an apparatus for inputting information according to the present disclosure.

Referring to FIG. 4, as implementation of the method shown in the above figures, the present disclosure provides an embodiment of an apparatus for inputting information. The apparatus embodiment corresponds to the method embodiment shown in FIG. 2. The apparatus may be specifically applied to various electronic devices.

As shown in FIG. 4, the information input apparatus 400 in the present embodiment includes: a receiving unit 401, a selecting unit 402, and an input unit 403, wherein the receiving unit 401 is configured to receive user-inputted voice information, the voice information being associated with content to be inputted in an input area of an application; the selecting unit 402 is configured to consider emojis associated with the voice information as a candidate result, the emojis comprising: emojis historically inputted in the input area of the application by multiple users inputting voice information semantically associated with the voice information, with a frequency higher than a frequency threshold; the input unit 403 is configured to input an emoji selected by the user from the candidate result, in the input area of the application.

In some optional implementations of the present embodiment, the apparatus 400 further includes: a voice recognition unit (not shown) configured to, before considering the emoji associated with the voice information as the candidate result, perform voice recognition for the voice information and obtain a sentence corresponding to the voice information; a semantic recognition unit (not shown) configured to perform semantic recognition for the sentence in a rule matching to obtain a semantic recognition result, the semantic recognition result comprising: a mood type indicating the user's mood; an emoji determining unit (not shown) configured to consider the emoji corresponding to the mood type as the emoji associated with the voice information.

In some optional implementations of the present embodiment, the apparatus 400 further includes: an information acquiring unit (not shown) configured to acquire marked information of a plurality of emojis, the marked information indicating the mood type corresponding to the emojis; a training unit (not shown) configured to use the emojis and the marked information as sample data to train a deep learning model; a mood type recognition unit (not shown) configured to use the trained deep learning model to recognize the mood types corresponding to a mass of emojis; an establishing unit configured to establish a corresponding relationship between the mass of emojis and mood types.

In some optional implementations of the present embodiment, the apparatus 400 further includes: a historical input information acquiring unit (not shown) configured to acquire multiple users' historical input information before receiving the user-inputted voice information, the historical input information comprising: input voice information in the historical input, and emojis inputted in the input area of the application; an associated voice information determining unit (not shown) configured to determine semantically associated multiple pieces of voice information; an emoji converging unit (not shown) configured to converge emojis corresponding to the semantically associated multiple pieces of voice information; an emoji selecting unit (not shown) configured to select, from the emojis, an emoji having a corresponding input frequency higher than the frequency threshold.

In some optional implementations of the present embodiment, the apparatus 400 further includes: an input method executing unit (not shown) configured to use the input method to receive the user-inputted voice information.

Figure 5:
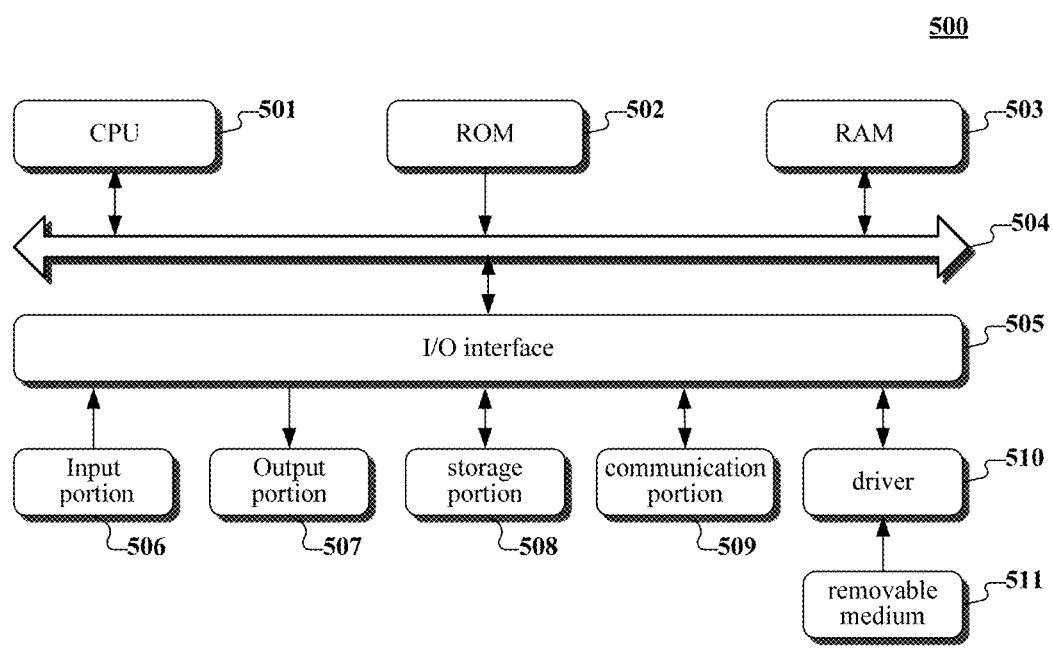
FIG. 5 is a structural schematic diagram of a computer system adapted to implement the information input apparatus according to an embodiment of the present disclosure.

Referring to FIG. 5, a schematic structural diagram of a computer system 500 adapted to implement an information input apparatus of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receive user inputted voice information, the voice information being associated with content to be inputted in an input area of an application; consider emojis associated with the voice information as a candidate result, the emojis comprising: emojis historically inputted in the input area of the application by multiple users inputting voice information semantically associated with the voice information, with a frequency higher than a frequency threshold; and input an emoji selected by the user from the candidate result in the input area of the application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for inputting information, comprising:
receiving user inputted voice information, the voice information being associated with content to be inputted in an input area of an application;
considering emojis associated with the voice information as a candidate result, the emojis comprising: emojis historically inputted in the input area of the application by multiple users inputting voice information semantically associated with the voice information, with a frequency higher than a frequency threshold; and
inputting an emoji selected by the user from the candidate result in the input area of the application;
the method further comprising:
acquiring marked information of a plurality of emojis, the marked information indicating a mood type corresponding to the emojis;
using the plurality of emojis and the marked information as sample data to train a deep learning model;
using the trained deep learning model to recognize the mood types corresponding to a mass of emojis;
establishing a corresponding relationship between the mass of emojis and the mood types.

2. The method according to claim 1, wherein before considering emojis associated with the voice information as a candidate result, the method further comprises:
performing voice recognition for the voice information and obtaining a sentence corresponding to the voice information;
performing semantic recognition for the sentence in a rule matching to obtain a semantic recognition result, the semantic recognition result comprising: the mood type indicating a mood of the user; and
considering the emoji corresponding to the mood type as the emoji associated with the voice information.

3. The method according to claim 1, wherein before receiving the user-inputted voice information, the method further comprises:
acquiring historical input information of the multiple users, the historical input information comprising: inputted voice information in the historical input, and emojis inputted in the input area of the application;
determining semantically associated multiple pieces of voice information;

converging emojis corresponding to the semantically associated multiple pieces of voice information;

selecting, from the emojis, an emoji having a corresponding input frequency higher than the frequency threshold.

4. The method according to claim 3, wherein the receiving user-inputted voice information comprises:

using an input method to receive the user-inputted voice information.

5. An apparatus for inputting information, wherein the apparatus comprising:

at least one processor; and a memory storing instructions, which when executed by the at least one processor, cause the at least one processor to perform operations, the operations comprising:

receiving user-inputted voice information, the voice information being associated with content to be inputted in an input area of an application;

considering emojis associated with the voice information as a candidate result, the emojis comprising: emojis historically inputted in the input area of the application by multiple users inputting voice information semantically associated with the voice information, with a frequency higher than a frequency threshold; and inputting an emoji selected by the user from the candidate result, in the input area of the application;

the operations further comprising:

acquiring marked information of a plurality of emojis, the marked information indicating a mood type corresponding to the emojis;

using the plurality of emojis and the marked information as sample data to train a deep learning model;

using the trained deep learning model to recognize the mood types corresponding to a mass of emojis;

establishing a corresponding relationship between the mass of emojis and mood types.

6. The apparatus according to claim 5, wherein before considering emojis associated with the voice information as a candidate result, the operations further comprise:

performing voice recognition for the voice information and obtain a sentence corresponding to the voice information;

performing semantic recognition for the sentence in a rule matching to obtain a semantic recognition result, the semantic recognition result comprising: the mood type indicating a mood of the user; and considering the emoji corresponding to the mood type as the emoji associated with the voice information.

7. The apparatus according to claim 5, wherein before receiving the user-inputted voice information, the operations further comprise:

acquiring historical input information of the multiple users, the historical input information comprising: inputted voice information in the historical input, and emojis inputted in the input area of the application;

determining semantically associated multiple pieces of voice information;

converging emojis corresponding to the semantically associated multiple pieces of voice information;

selecting, from the emojis, an emoji having a corresponding input frequency higher than the frequency threshold.

8. The apparatus according to claim 7, wherein the operations further comprise:

using an input method to receive the user-inputted voice information.

9. A non-transitory computer storage medium storing a computer program, which when executed by one or more processors, cause the one or more processors to perform operations, the operations comprising:

receiving user inputted voice information, the voice information being associated with content to be inputted in an input area of an application;

considering emojis associated with the voice information as a candidate result, the emojis comprising: emojis historically inputted in the input area of the application by multiple users inputting voice information semantically associated with the voice information, with a frequency higher than a frequency threshold; and inputting an emoji selected by the user from the candidate result in the input area of the application;

the operations further comprising:

acquiring marked information of a plurality of emojis, the marked information indicating a mood type corresponding to the emojis;

using the plurality of emojis and the marked information as sample data to train a deep learning model;

using the trained deep learning model to recognize the mood types corresponding to a mass of emojis;

establishing a corresponding relationship between the mass of emojis and mood types.

10. The non-transitory computer storage medium according to claim 9, wherein before considering emojis associated with the voice information as a candidate result, the operations further comprise:

performing voice recognition for the voice information and obtaining a sentence corresponding to the voice information;

performing semantic recognition for the sentence in a rule matching to obtain a semantic recognition result, the semantic recognition result comprising: the mood type indicating a mood of the user; and considering the emoji corresponding to the mood type as the emoji associated with the voice information.

11. The non-transitory computer storage medium according to claim 9, wherein before receiving the user-inputted voice information, the operations further comprise:

acquiring historical input information of the multiple users, the historical input information comprising: inputted voice information in the historical input, and emojis inputted in the input area of the application;

determining semantically associated multiple pieces of voice information;

converging emojis corresponding to the semantically associated multiple pieces of voice information;

selecting, from the emojis, an emoji having a corresponding input frequency higher than the frequency threshold.

12. The non-transitory computer storage medium according to claim 11, wherein the receiving user-inputted voice information comprises:

using an input method to receive the user-inputted voice information.

* * * * *